(12) United States Patent  (10) Patent No.: US 8,908,779 B2
Douglass                    (45) Date of Patent:     Dec. 9, 2014

(54) ISOLATED COMMUNICATIONS INTERFACE

(75) Inventor: James Michael Douglass, Lewisville, TX (US)

(73) Assignee: Linear Technology Corporation, Milpitas, CA (US)

(*) Notice: Subject to any disclaimer, the term of this patent is extended or adjusted under 35 U.S.C. 154(b) by 129 days.

(21) Appl. No.: 13/458,765

(22) Filed: Apr. 27, 2012

(65) Prior Publication Data

US 2012/0275527 A1  Nov. 1, 2012

Related U.S. Application Data

(60) Provisional application No. 61/480,832, filed on Apr. 29, 2011.

(51) Int. Cl.
    *H04B 3/00* (2006.01)
    *H04L 25/00* (2006.01)
    *H04L 25/02* (2006.01)

(52) U.S. Cl.
    CPC ........ *H04L 25/0278* (2013.01); *H04L 25/0272* (2013.01)
    USPC .......................................... 375/257; 375/222

(58) Field of Classification Search
    USPC ................................. 375/257, 258
    See application file for complete search history.

(56) References Cited

U.S. PATENT DOCUMENTS

2005/0068223 A1*  3/2005  Vavik ............................ 342/51
2007/0103205 A1*  5/2007  Whetsel ........................ 327/108

FOREIGN PATENT DOCUMENTS

EP          0042976 A1     1/1982

OTHER PUBLICATIONS

Bennett. (2011). Isolated data transmission and power conversion integrated into a surface mount package.*LT Journal of Analog Technology*, 30-37.
*CAN bus*. (Apr. 3, 2012). Retrieved from http://en.wikipedia.org/wiki/CAN_bus.
Complete Isolated RS485/RS422 μModule Tranceiver Power. *Linear Technology*, (2009), 24 pages.
*Ethernet over twisted pair*. (Apr. 3, 2012). Retrieved from http://en.wikipedia.org/wiki/Ethernet_over_twisted_pair.
$I^2C$. (Apr. 3, 2012). Retrieved from http://en.wikipedia.org/wiki/I2c.
*Opto-isolator*. (Apr. 3, 2012). Retrieved from http://en.wikipedia.org/wiki/Opto-isolator.
Physical serial communications standards. *Boston Technology: Data Communications*, (2003), 67 pages.
*RS-485*. (Apr. 3, 2012). Retrieved from http://en.wikipedia.org/wiki/RS-485.
*Serial peripheral interface bus*. (Apr. 3, 2012). Retrieved from http://en.wikipedia.org/wiki/Serial_Peripheral_Interface_Bus.
European Search Report issued in European Patent Application No. 12003031.7 dated Jul. 19, 2012.

* cited by examiner

*Primary Examiner* — Erin File
(74) *Attorney, Agent, or Firm* — Schiff Hardin LLP

(57)  ABSTRACT

A method and interface for serial communication is provided. The interface includes a differential input/output having a first node and a second node. There are several input/output nodes arranged to receive serial interface signals. The interface includes a transmitter configured to drive a twisted pair cable at the differential input/output. There is a receiver coupled to the differential input/output that includes a window comparator. A serial port control unit provides serial data to the transmitter and receives serial data from the receiver. The serial communications interface transmits serial data to and receives serial data from a second serial communications interface independent of a reference clock and is galvanically isolated from the second serial communications interface.

20 Claims, 8 Drawing Sheets

| Characteristic | 485/CAN | I-485/I-CAN | ENET | SPI/I2C | DIG | ISO |
|---|---|---|---|---|---|---|
| Galvanic Isolation | N | Y | Y | N | Y | Y |
| Balanced, Impedance-Matched Differential Signaling for Cables | Y | Y | Y | N | N | Y |
| Clock Insensitivity | N | N | N | Y | Y | Y |
| Bidirectionality on a Single Link | Y | Y | N | Y | Y | Y |
| No Isolated Power on Cable Side of Isolation | N/A* | N | Y | N/A* | N/A* | Y |
|  | \* For systems that do not provide galvanic isolation and operation over cables, the "No Isolated Power" characteristic is not applicable. | | | | | |

FIG. 1 (Background)

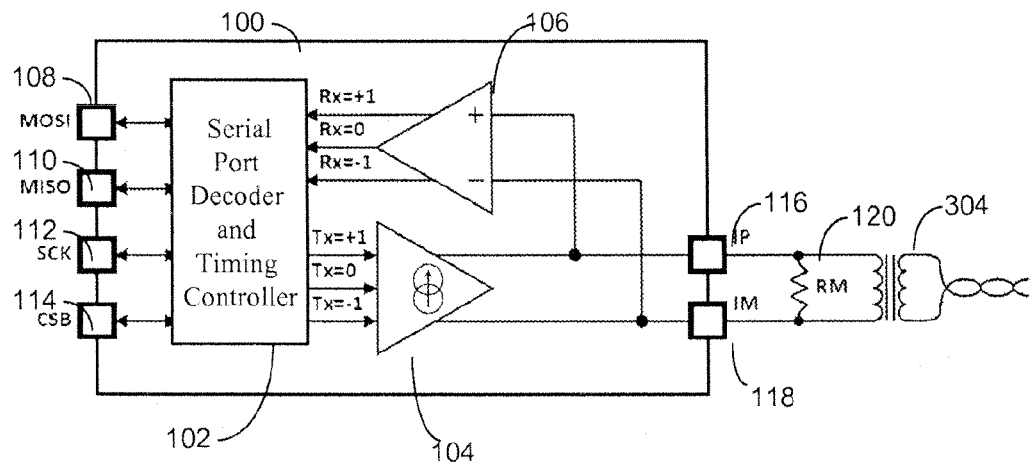

FIG. 2

| PULSE NAME | FIRST LEVEL | SECOND LEVEL | ENDING LEVEL |
|---|---|---|---|
| Short +1 | +1 (50ns) | -1 (50ns) | 0 |
| Short -1 | -1 (50ns) | +1 (50ns) | 0 |
| Long +1 | +1 (150ns) | -1 (150ns) | 0 |
| Long -1 | -1 (150ns) | +1 (150ns) | 0 |

| COMMUNICATION EVENT | TRANSMITTED PULSE |
|---|---|
| $\overline{CS}$ falling | Long -1 |
| $\overline{CS}$ rising | Long +1 |
| SCK latching edge, MOSI=0 | Short -1 |
| SCK latching edge, MOSI=1 | Short +1 |

FIG. 9

| RECEIVED PULSE | SPI PORT OUTPUT |
|---|---|
| Long -1 | Drive $\overline{CS}$ low |
| Long +1 | Drive $\overline{CS}$ high |
| Short -1 | Set MOSI=0, pulse SCK |
| Short +1 | Set MOSI=1, pulse SCK |

FIG. 10

ISOLATED COMMUNICATIONS INTERFACE

CROSS-REFERENCES TO RELATED APPLICATIONS

This application claims the benefit of U.S. Provisional Application No. 61/480,832, filed on Apr. 29, 2011, the disclosure of which Application is incorporated by reference herein.

TECHNICAL FIELD

This disclosure generally relates to the electrical arts, and more particularly to serial communications.

DESCRIPTION OF RELATED ART

Several physical interface standards associated with serial data communications for instrumentation and control systems exist today. Serial communication is the process of sending data one bit at a time, sequentially, over a communication channel or computer bus. Each interface standard defines the electrical and mechanical details that allow equipment from different manufacturers to be connected and able to communicate. Each interface has its unique characteristics and benefits.

For battery management systems, where a plurality of battery modules communicate with each other, one characteristic considered for serial communication is galvanic isolation. Battery modules that are stacked in series operate at different voltage potentials. Galvanic isolation prevents charge from flowing between the two sides of an isolation barrier while allowing information to pass through the isolation. Such isolation minimizes the effects of noise, allows for common mode voltage differences, and prevents ground loops. Accordingly, two sides of a communication link can operate at different voltages.

A second characteristic considered for battery management systems is balanced and impedance-matched differential signaling. Battery modules may be physically separated from each other. Because of this, they are connected by cables that pass signals between modules. However, cables can act as antennas, transmitting and receiving radio frequency (RF) power. Battery management systems strive for low emission of RF power to prevent interference with other nearby systems. Similarly, it is beneficial for battery management systems to have a low susceptibility to received RF power to prevent interference with its communication link. Still further, cables for serial communication links can also act as transmission lines. If a transmission line is not terminated with the proper impedance, then communication signals may reflect back and forth between a transmitter (at one end of the communication link) and a receiver (at the other side of the communication link), thereby corrupting the communication signals. Accordingly, it is beneficial for serial communication to be balanced, differential, and impedance matched.

A third characteristic considered for battery management systems is clock independence. Typically, communication systems include a form of data coordination, such that a receiver can determine when data is available. The two main categories for serial communication are asynchronous and synchronous.

In asynchronous serial communication, bits of information are transmitted between two devices at an arbitrary point in time, where a start bit and a stop bit identifies the string of information being sent. However, both devices typically communicate at an agreed upon data rate. For example, if both the transmitter and receiver are operated at the same frequency, then the receiver can sample the incoming signal at a predetermined rate to obtain the data. In another asynchronous approach, the clock is embedded in the data stream. In this regard, the transmitter sends the data while the receiver extracts the clock signal embedded in the data stream. In both asynchronous approaches, there is substantial circuit complexity and coordination between the transmitter and receiver for reliable serial communication.

In synchronous serial communication, an explicit clock signal is sent along with the data signal(s) between the transmitter at one at one end of the communication link and a receiver at the other side of the communication link. While synchronous systems may be simpler to implement, they require at least two signal paths (i.e., data and clock). Having separate signal paths and maintaining the timing relationship between the two paths requires additional cable wires and circuit complexity. Accordingly, it would be beneficial to have a serial communication system that is more independent of system clocks.

A fourth characteristic considered for battery management systems is bi-directionality. In some conventional approaches, the transmission path is separate from the receiving path. While simplifying system design complexity, such approach requires additional wires and duplication of circuitry that could potentially be shared. In contrast, in bi-directional communication systems, the same wires are used for both transmission and reception.

A fifth characteristic considered for battery management systems is power isolation. Some conventional systems, such as isolated implementations of the Electronic Industry Alliance (EIA)-485 and Controller Area Network (CAN) interfaces, use galvanic isolation between the transceiver controller and the driver/receiver. However, the driver/receiver requires a power supply that is also galvanically isolated from the transceiver controller. Galvanically isolating the power supplies for the driver/receiver involves additional circuitry, thereby increasing cost and system complexity. It therefore would be beneficial to have a communication link that does not require galvanically isolated power supplies.

FIG. 1 is a table that summarizes the features of different serial communication standards. In FIG. 1, the first column lists the features discussed above. The second column illustrates the capabilities of the EIA-485/CAN communication systems. The EIA-485 standard enables the configuration of inexpensive local network and multidrop communication links. The CAN standard is a vehicle bus standard that allows microcontrollers and devices to communicate with each other within a vehicle without a host computer. Neither system in this column (i.e., EIA-485/CAN) provides galvanic isolation or clock insensitivity.

The third column of FIG. 1 illustrates the capabilities of the isolated EIA-485/CAN communication systems. While the systems in this column may provide more isolation to protect against dangerous electrical transients and to eliminate ground loops, they fail to provide clock insensitivity and they require isolated power.

The fourth column of FIG. 1 illustrates the capabilities of the Ethernet/IEEE 802.3 (ENET) communication system. Ethernet over twisted pair technologies use twisted-pair cables for the physical layer of an Ethernet computer network. Such system does not provide clock insensitivity or bi-directionality on a single link.

The fifth column of FIG. 1 illustrates the capabilities of the Serial Peripheral Interface Bus (SPI) and the Integrated-Integrated Circuit ($I^2C$) systems. The SPI bus is a synchronous serial data link standard. Devices communicate in master/ slave mode where the master device initiates the data frame. Multiple slave devices are allowed with individual slave select (e.g., chip select) lines. As to I²C, it is a multi-master serial bus that allows low-speed peripherals to communicate with a motherboard, embedded system, cell phone, or other electronic devices. Neither system provides galvanic isolation or balanced, impedance-matched differential signaling.

The sixth column of FIG. 1 illustrates the capabilities of the optocouplers/digital isolator (DIG) systems. An optocoupler is an electronic device that transfers electrical signals by using light waves to transmit information with electrical isolation between its input and output. It prevents high voltages or rapidly changing voltages on one side of the circuit from damaging components or distorting transmissions on the other side. Other digital isolators operate in a similar fashion, using transformer or capacitor isolation barriers rather than optical isolation. However, these systems do not provide balanced, impedance-matched differential signaling and are therefore not capable of reliable communication over cables.

In view of the foregoing, it would be desirable to have a serial interface method and system that is galvanically isolated, capable of reliable communication over cables, and insensitive to a reference clock. It would be further desirable to have a serial interface method and system that is bidirectional on a single signal link and does not require an isolated power supply.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 illustrates a table that summarizes the features of different serial communication standards.

FIG. 2 illustrates a block diagram of a bidirectional communications interface consistent with an embodiment of the present invention.

FIG. 9 illustrates four pulse types transmitted by the bidirectional communications interface, consistent with an embodiment of the present invention.
FIG. 10 illustrates slave SPI output signals, consistent with an embodiment of the present invention.

DETAILED DESCRIPTION OF ILLUSTRATIVE EMBODIMENTS

Figure 3:
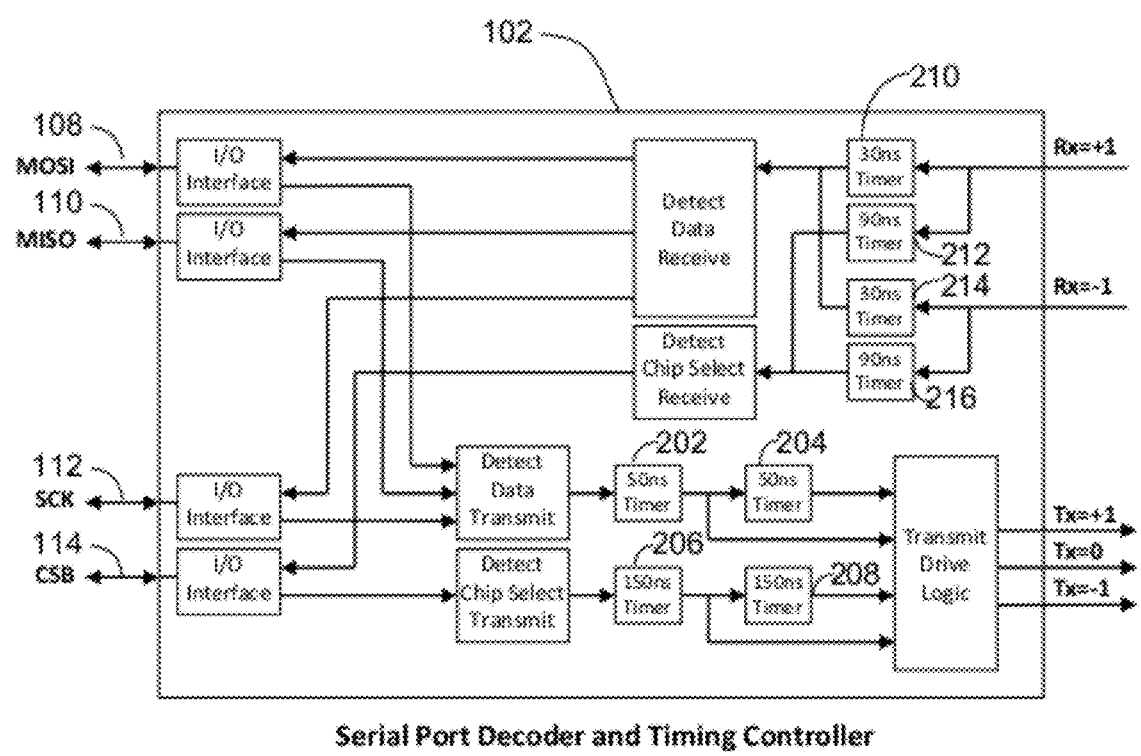
FIG. 3 illustrates a block diagram of the serial port decoder and timing controller consistent with an embodiment of the present invention.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Reference now is made in detail to the examples illustrated in the accompanying drawings and discussed below. FIG. 2 illustrates a block diagram of a bidirectional communications interface consistent with an embodiment of the present invention. The bidirectional communications interface 100 includes a Serial Port Decoder and Timing Controller (SPDTC) 102. A transmitter 104 is coupled to one or more outputs of the SPDTC 102. The transmitter 104 has a differential output IP and IM (116 and 118 respectively), thereby allowing the output of the bidirectional communications interface 100 to be balanced. The outputs 116 and 118 are also configured to operate as inputs to a differential receiver 106. Thus, since the same nodes 116 and 118 are used to both transmit data and receive data, the communications interface 100 is bidirectional. One or more outputs of the differential receiver 106 are coupled to the Serial Port Decoder and Timing Controller 102. The bidirectional communications interface 100 communicates with one or more substantially similar bidirectional communication interfaces 100.

FIG. 3 illustrates a block diagram of the Serial Port Decoder and Timing Controller (SPDTC) 102 consistent with an embodiment of the present invention. Multiple pulse timers (e.g., 202 to 208) are used to generate transmitted signals with 50 ns or 150 ns pulse widths respectively. Additional pulse timers (e.g., 210 to 216) of 30 ns and 90 ns widths respectively are used to measure received signal widths. The other blocks in the diagram implement logic to control the pulse timers and to decode the outputs of the pulse timers.

Figure 4:
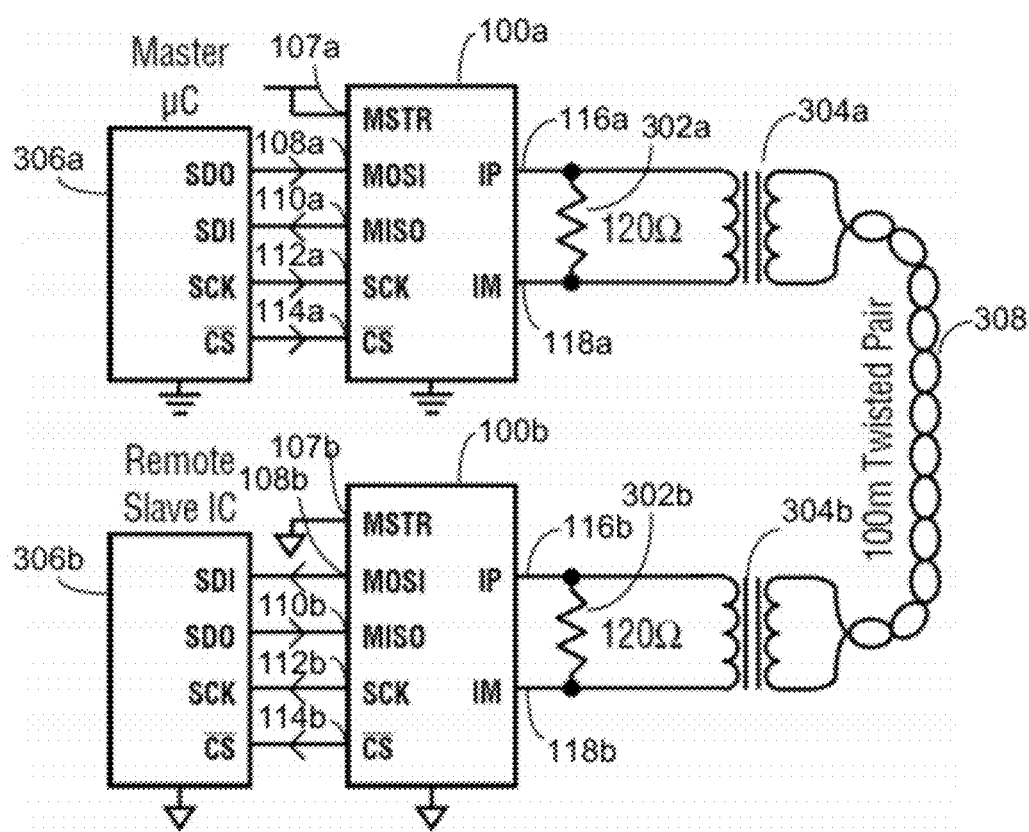
FIG. 4 illustrates an example application of several communication interfaces configured to communicate with each other.

FIG. 4 illustrates an example application of several communication interfaces configured to communicate with each other. The bidirectional communications interface devices 100a and 100b communicate in master/slave mode with each other, where the master microcontroller (master device) 306a initiates the data communication. In one embodiment, the connections to a master bidirectional communications interface 100 are standard Serial Peripheral Interface Bus (SPI) signals, including master out, slave input (MOSI) 108; master input, slave output (MISO) 110; serial clock (SCK) 112; and chip select (CSB) 114.

Input node MSTR (e.g., 107a and 107b) determines whether the serial interface device (100a or 100b) is used as a master or slave serial interface device. For example, the MSTR node is tied to $V_{DD}$ in master mode and to ground in slave mode. If connected on the master side of an interface (e.g., 100a), the MOSI 108 node receives a data signal from a master microcontroller 306a. If connected on the slave side of the interface (e.g., 100b), this node 108b drives the data signal input to the slave device 306b. The slave device 306b may comprise a remote sensor, data converter, or microcontroller that is controlled or monitored by the master microcontroller 306a.

The MISO node (e.g., 110a 110b) drives the data signal to the master microcontroller 306a when connected on the master side of an interface (e.g., 100a) and receives data signal output from the slave device 306*b* when connected on the slave side of an interface (e.g., 100*b*). Similarly, the SCK node receives the clock signal from the master controller 306*a* when connected on the master side of an interface (e.g., 100*a*) and outputs the clock signal to the slave device 306*b* when connected on the slave side of an interface (e.g., 100*b*).

In the example of FIG. 4, two bidirectional communication interfaces 100*a* and 100*b* communicate with each other through a twisted pair cable 308. Twisted pair cabling is a type of wiring in which two conductors (the forward and return conductors of a single circuit) are twisted together, which cancels out electromagnetic interference (EMI) from external sources, such as electromagnetic radiation from unshielded twisted pair (UTP) cables, and crosstalk between neighboring pairs. In such balanced pair operation, the two wires carry equal and opposite signals and the destination (e.g., 100*b*) detects the difference between the two. Noise sources that introduce signals into the twisted pair cable 308 by coupling of electric or magnetic fields couple to both wires equally. Thus, the noise produces a common-mode signal which is cancelled at the receiver (e.g., 100*b*) when the difference signal is taken at the first and second nodes (i.e., plus and minus nodes 116*b* and 118*b* respectively).

The twisted pair cable 308 is also impedance matched by termination resistors 302*a* and 302*b* respectively. In this regard, the resistors 302*a* and 302*b* are designed to match the impedance of the electrical load (e.g., inductively coupled twisted pair cable 308) to maximize the power transfer between a first bidirectional communications interface 100*a* and a second bidirectional communications interface 100*b* and minimize reflections from the electrical load.

The first bidirectional communications interface 100*a* is paired with a microcontroller 306*a*. The second bidirectional communications interface 100*b* reproduces the SPI signals for use by one or more slave devices 306*b*. The communication between a first bidirectional communications interface 100*a* and a second bidirectional communications interface 100*b* is initiated by the master microcontroller 306*a*. There is no explicit clock signal connected between the master interface 100*a* and slave interface 100*b*. Further, there is no clock signal embedded in the data link that is locked onto by the slave device using a clock recovery circuit such as a phase-locked loop (PLL) or delay-locked loop (DLL).

A typical asynchronous communication system sends data in packets that contain multiple bits of data. For example, the transmitter sends a start sequence with a predetermined format that the receiver detects. A stream of data follows the start sequence. If the protocol has an embedded clock, (e.g., as with Ethernet), then the receiver uses a phase-locked or delay-locked loop to lock on to the embedded clock so that it can accurately determine the data sampling point. The locking loop adds significant circuit and system complexity.

In asynchronous protocols without embedded clocks, (e.g., such as EIA-485 and CAN), the transmitter and receiver have clocks that operate at substantially identical frequencies. When a receiver detects a start sequence, it aligns its sampling clock with the received start sequence. Each subsequent data bit is then sampled at a precise time relative to the start sequence. Given a transmitter clock period T, bit N of the serial data is measured by the receiver at time T*N following the start sequence. If the receiver sampling clock period is different from the transmitter clock period by an error time E, then the sampling time of bit N will be equal to (T+/−E)*N. The total sampling error would then be equal to (T+/−E)*N−T*N, which is equal to +/−E*N. As more bits are read, E*N approaches the half of the clock period T and the receiver may erroneously sample bit N−1 or bit N+1 when it should be sampling bit N. For example, if the error E is 3% of T, then at most 16 bits can be read before an erroneous reading occurs. Consequently, such systems typically require an accuracy of better than +/−1% to operate with desired packet lengths of approximately 50 bits. Such highly accurate timing references are difficult to manufacture and are expensive.

In one embodiment of the present invention, since only one bit is transmitted and received at a time, there is no bit-to-bit clock period T that accumulates sampling error. Accordingly, each of the transmit clock timers (202 to 208) and receive clock timers (210 to 216) can have substantial time errors (e.g., about +/−20%) while and the system will still operate correctly. The imprecise clock timers (202 to 216) are the only time or frequency components in the system. No accurate frequency reference or precise timing reconstruction is required on either side of the communications link.

The first bidirectional communications interface 100*a* is galvanically isolated from the second bidirectional communications interface 100*b*. For example, the differential output (116*a* and 118*a*) of the bidirectional communications interface 100*a* is magnetically coupled 304*a* to the twisted pair cable 308. Thus, in this example, transformers are used to pass data across the isolation boundary. In one embodiment, each transformer 304*a* and 304*b* comprises a toroidal ferrite core with one high voltage insulated winding and a second low voltage insulated winding. The high voltage winding uses supplementary-rated Teflon-insulated wire, comprising two independent layers. In one example, the total insulation thickness of the two independent layers is 76 μm. Accordingly, the two sides of a communication link (e.g., serial communication interfaces 100*a* and 100*b*) can operate at different voltages.

Figure 5A:
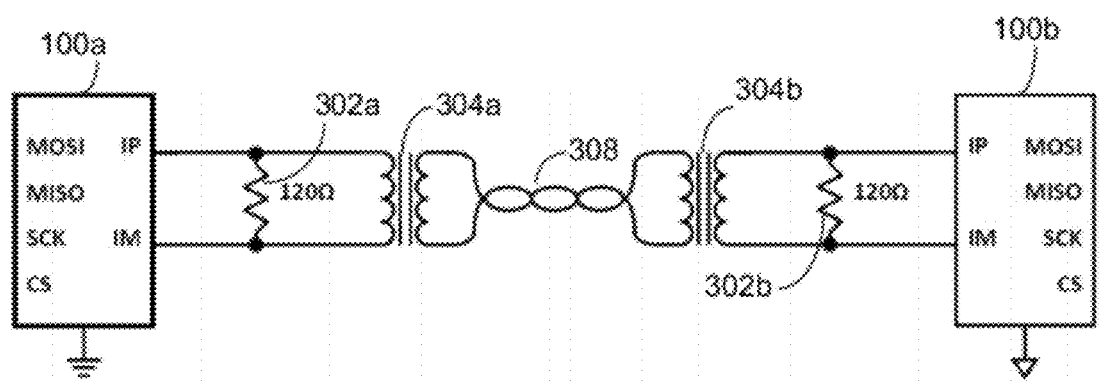
FIG. 5a illustrates an exemplary application of several communication interfaces that are galvanically isolated by magnetic coupling.
Figure 5B:
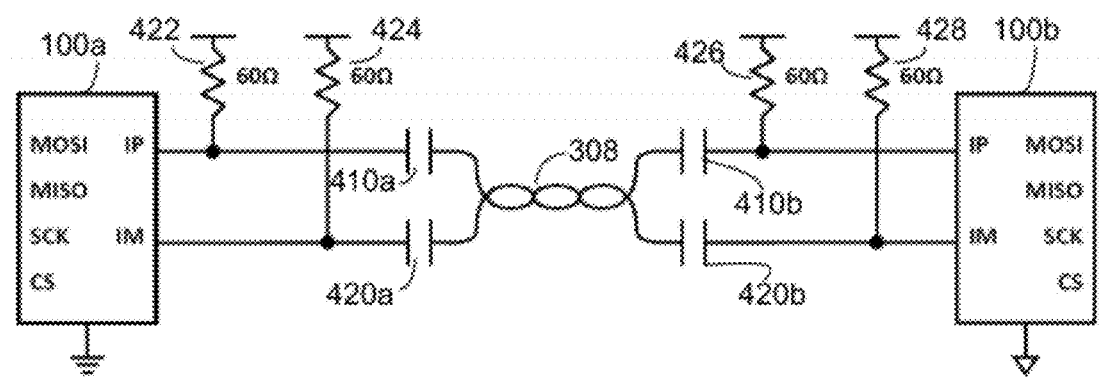
FIG. 5b illustrates an exemplary application of several communication interfaces that are galvanically isolated by capacitive coupling.

While magnetic coupling is illustrated in FIG. 4, galvanic isolation can include capacitive and giant magnetoresistance (GMR) devices. FIGS. 5*a* and 5*b* compare galvanic isolation through magnetic coupling and capacitive coupling. For example, FIG. 5*b* illustrates an exemplary application of several communications interfaces (100*a* and 100*b*) that are galvanically isolated by capacitive coupling. For example, when using capacitors (410*a/b* and 420*a/b*) as the isolation bridge between the bidirectional communications interface devices 100*a* and 100*b*, pull-up resistors (422 to 428) may be used to pull the IP and IM nodes up respectively. While transformers (e.g., 304*a* and 304*b*) provide better interference immunity, capacitors (e.g., 410*a/b* and 420*a/b*) are lower in cost to implement.

Figures 6, 7:
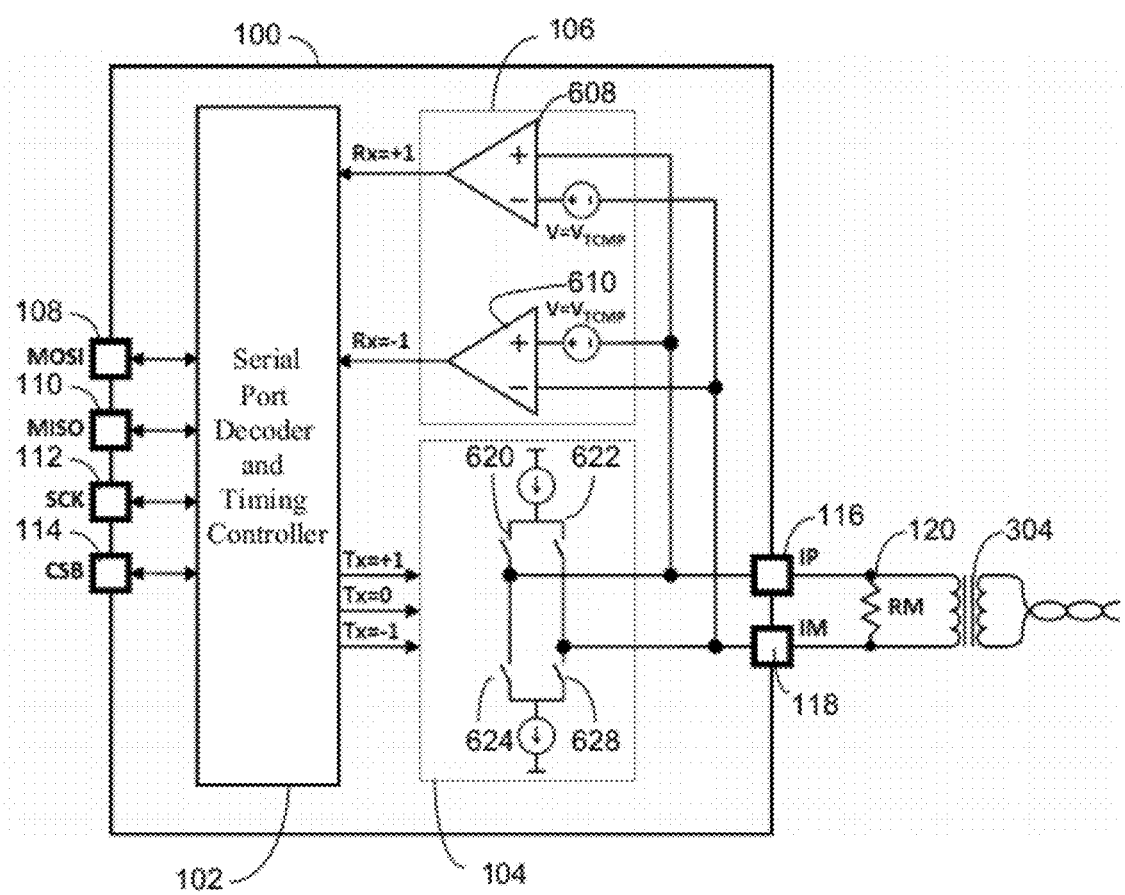
FIG. 6 illustrates an exemplary table of different transmit pulses.
FIG. 7 illustrates a block diagram of a bidirectional communications interface consistent with an embodiment of the present invention.

Referring back to FIG. 2, in one embodiment, transmitter 106 provides three logic levels: a first logic level (+1), a second logic level (0), and a third logic level (−1). To transmit a logic +1, the IP node 116 sources current while the IM node 118 sinks current, developing a positive voltage between the IP node 116 and the IM node 118, across the load resistor RM 120. To transmit a logic −1, IP node 116 sinks current while IM node 118 sources current, developing a negative VIP to VIM voltage. For a logic 0 output, both current sinks/sources are turned off. By way of example, FIG. 6 provides an exemplary table of different transmit pulses. Pulses can be "short" or "long" lasting in 50 ns or 150 ns respectively. The second level is the opposite of the first level and each pulse ends with a level of 0.

FIG. 7 illustrates a block diagram of a bidirectional communications interface consistent with an embodiment of the present invention. The transmitter 104 is a differential current driver. The driver sources current to node IP 116 and node IM 118 through switches 620 and 622, respectively. The driver sinks current from node IP 116 and node IM 118 through switches 624 and 628, respectively. Thus, the bidirectional communications interface 100 has an integrated driver which does not require an external power supply to drive the twisted pair cable 308.

By contrast, many other systems with galvanic isolation (for example, isolated EIA-485 and isolated CAN) typically have the isolation barrier between the controller circuitry and the line driver/receiver circuitry. In those systems the line driver/receiver circuits include a source of power to operate. That power must also be galvanically isolated from the controller so that the line driver/receiver can operate at a different voltage from the controller. In one embodiment of the present invention, since the controller circuitry and the line driver/receiver circuitry are on the same side of the isolation barrier (e.g., 304), bidirectional communications interface 100 does not require a galvanically isolated power supply for the transmitter 104 or the receiver 106.

Figure 8A:
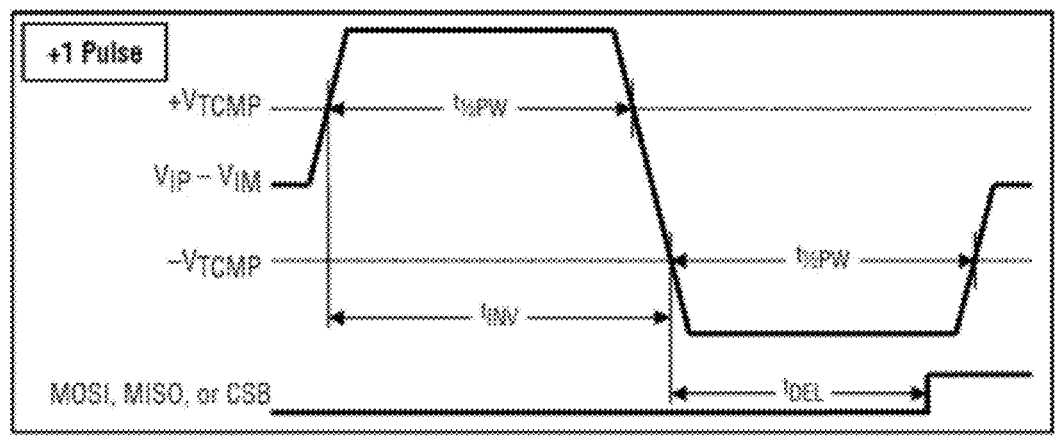
FIG. 8a illustrates timing specifications for the +1 pulse.
Figure 8B:
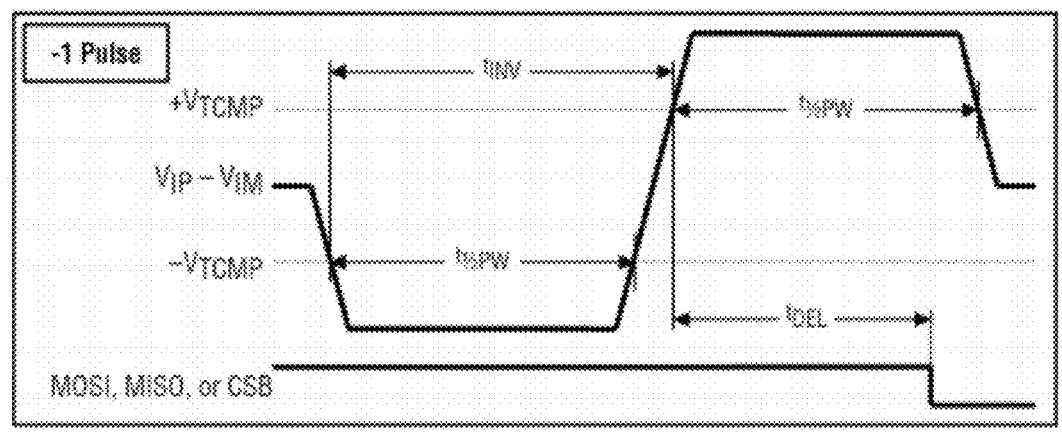
FIG. 8b illustrates timing specifications for the −1 pulse.

The receiver 106 comprises a window comparator (e.g., 608 and 610) whose outputs are connected to the Serial Port Decoder and Timing Controller (SPDTC) 102. In one example, the window comparator include a first amplifier 608 wherein the negative terminal includes a voltage threshold ($V_{TCMP}$) reference and a second amplifier 610 wherein the positive terminal includes a $V_{TCMP}$ reference. Accordingly, the comparator has a differential $V_{TCMP}$ reference. When $V_{IP}-V_{IM}$ (e.g., voltage between nodes 116 and 118) is greater than $+V_{TCMP}$, the window comparator 606 detects a logic +1. When $V_{IP}-V_{IM}$ is less than $-V_{TCMP}$, the window comparator 606 detects a logic −1. A logic 0 indicates $V_{IP}-V_{IM}$ is between the positive and negative thresholds. The SPDTC verifies that the pulses have the correct width and discriminates between short and long pulses. FIGS. 8a and 8b illustrate timing specifications for the 1 and −1 pulses transmitted and received by the IP 116 and IM 118 nodes. In one example, a valid pulse meets the following minimum specification for $t_{1/2PW}$ and the maximum specification for $t_{INV}$:

Chip Select Pulse: $t_{1/2PW(CS)} > 120$ ns, $t_{INV(CS)} < 200$ ns

Data pulse: $t_{1/2PW(D)} > 40$ ns, $t_{INV(D)} < 70$ ns

In one embodiment, a bidirectional communications interface 100 configured to interface with an SPI master microcontroller detects one of four communication events on its SPI port: CSB falling, CSB rising, SCK latching edge with MOSI=0, and SCK latching edge with MOSI=1. When an event is detected, the bidirectional communications interface 100 transmits one of the four pulse types, as tabulated in FIG. 9. A bidirectional communications interface 100 configured to interface with an SPI slave receives a transmitted pulse and sets its output SPI port, as tabulated in FIG. 10.

A slave bidirectional communications interface 100 transmits a data pulse, providing the state of the MISO 108 input, in response to a pulse that has been received from the master bidirectional communications interface 100. In one embodiment, a slave bidirectional communications interface 100 only transmits a short −1 pulse (MISO=0), not a +1 pulse. This allows addressable SPI slave devices to share a single slave bidirectional communications interface 100b (referred to as multi-drop).

SPI devices (e.g., microcontroller 306) may use one clock edge to latch data and the other edge to shift data. This may avoid timing problems associated with clock skew. Data may be latched on a rising clock edge or falling clock edge. In one embodiment, the bidirectional communications interface 100 discussed herein supports all four SPI operating modes, as illustrated below:

| MODE | POL | PHA | DESCRIPTION |
|---|---|---|---|
| 0 | 0 | 0 | SCK idles low, latches on rising (1$^{st}$) edge |
| 1 | 0 | 1 | SCK idles low, latches on falling (2$^{nd}$) edge |
| 2 | 1 | 0 | SCK idles high, latches on falling (1$^{st}$) edge |
| 3 | 1 | 1 | SCK idles high, latches on rising (2$^{nd}$) edge |

The SPI Clock Phase Input (PHA) and the SPI Clock Polarity Input are additional inputs to the bidirectional communications interface 100 (not shown) that set the clock phase and polarity respectively. If clock phase PHA=0, the SPI device is provided positive pulses (SCK idles low). If clock polarity POL=0 (e.g., first digital voltage level), data is latched on the rising clock edge. If POL=1 (e.g., second digital voltage level), data is latched on the falling clock edge, which means the rising (first) clock edge is used to shift or toggle data. If clock phase PHA=1, the SPI device is provided negative pulses (SCK idles high). Data is latched on the falling clock edge if POL=0, and on the rising edge if POL=1.

Figure 11:
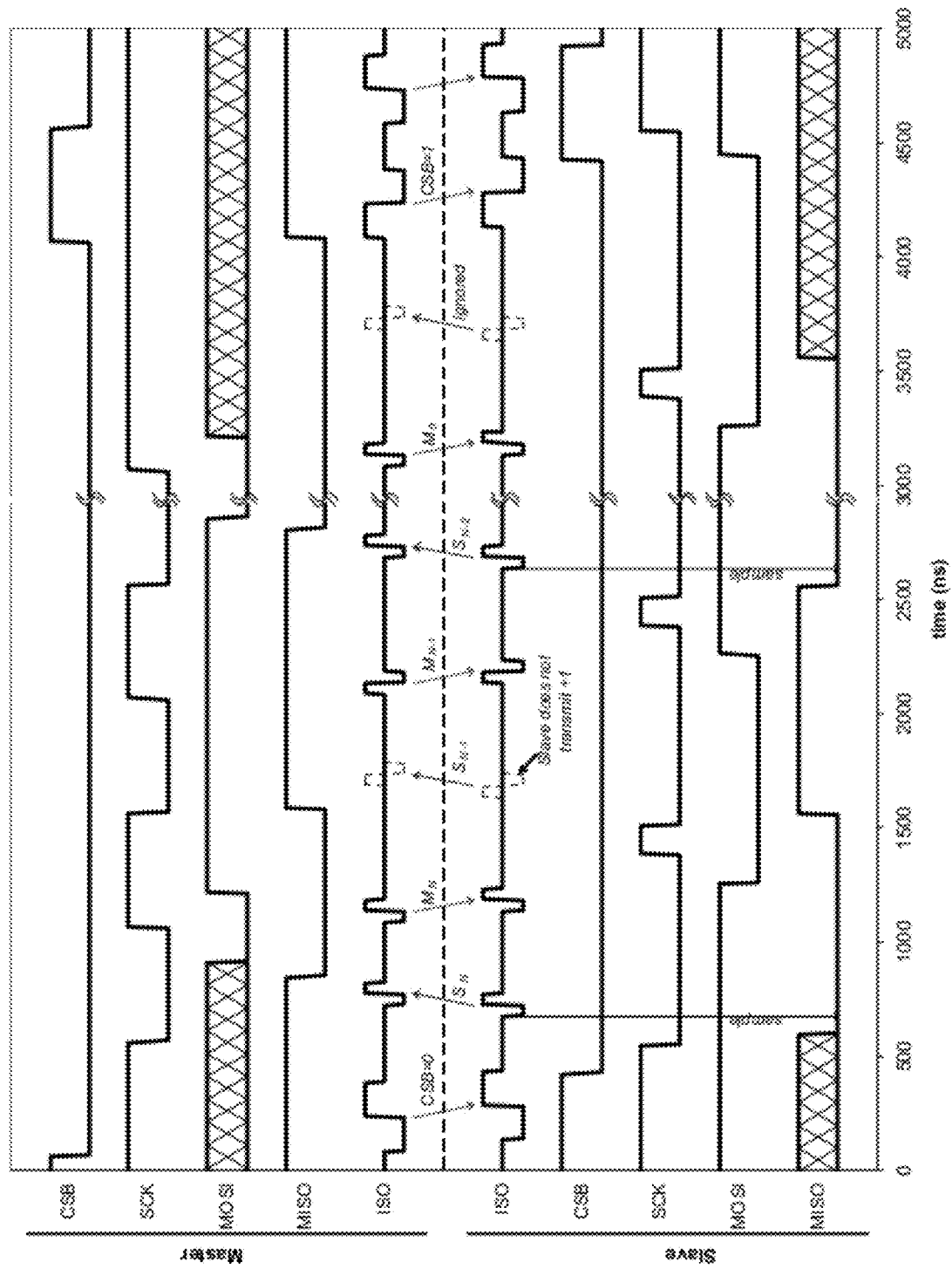
FIG. 11 illustrates an exemplary timing diagram of a bidirectional communications interface consistent with an embodiment of the present invention.

FIG. 11 is an exemplary timing diagram that illustrates how a bidirectional communications interface 100 configured as a master interacts with a bidirectional communications interface 100 configured as a slave.

For example, a master microcontroller 306 initiates communication by lowering CSB 114. The bidirectional communications interface 100 converts this transition into a long −1 pulse on its IP/IM nodes. The pulse traverses the isolation barrier and arrives at the IP/IM nodes of the slave bidirectional communications interface 100. Once validated, the long −1 pulse is converted back into a falling CSB transition, this time supplied to the slave SPI device.

Before the master SPI device supplies the first latching clock edge (e.g., a rising edge), the slave bidirectional communications interface 100 transmits the initial slave data bit SN. The bidirectional communications interface 100 determines the initial slave data bit SN by sampling the state of the MISO after a predetermined delay.

If MISO=0, the slave bidirectional communications interface 100 transmits a short −1 pulse to the master bidirectional communications interface 100. The master bidirectional communications interface 100 receives and decodes the pulse and sets the master MISO=0 (matching the slave). However, if the slave device provides an MISO=1, the slave bidirectional communications interface 100 does not transmit a pulse. The master microcontroller 306 interprets this null response as a +1 and sets the master microcontroller 306 MISO=1. This allows connecting multiple slave bidirectional communications interfaces 100 to a single twisted pair cable 308 with no signal conflicts.

After the falling CSB sequence, every latching clock edge on the master converts the state of the MOSI pin into a data pulse (MN, MN−1, ... M0) while simultaneously latching the slave device's 306b data bit. As the slave bidirectional communications interface 100 receives each data bit, it sets the slave MOSI pin to the proper state and generates an SCK pulse before returning the slave device's 306b MISO data (either as a short −1 pulse, or as a null pulse).

When the master microcontroller 306a is ready to end communication, the microcontroller 306a waits for the slave device to return one last data bit. However, this last bit may be ignored. In one embodiment, the slave bidirectional communications interface 100 returns a data bit, since it cannot predict when communication ends. The master microcontroller 306a can then raise CSB, which is transmitted to the slave device 306b in the form of a long +1 pulse. The process ends with the slave bidirectional communications interface 100 transitioning CSB high, and returning SCK to the idle state.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

What is claimed is:

1. A serial communications interface, comprising:
    a differential input/output having a first node and a second node;
    a plurality of input/output nodes arranged to receive serial interface signals;
    a transmitter configured to drive a twisted pair cable at the differential input/output;
    a receiver coupled to the differential input output, the receiver comprising a window comparator; and
    a serial port controller unit coupled to the serial interface input/output nodes, the transmitter, and the receiver; wherein:
        the serial port controller unit is configured to provide serial data to the transmitter and receive serial data from the receiver;
        the transmitter and the twisted pair cable are on opposite sides of the galvanic isolation;
        the serial port controller, the receiver, and the transmitter are on the same side of the galvanic isolation; and
        the serial communications interface is:
            configured to transmit serial data to and receive serial data from a second serial communications interface one data bit at a time, without a clock reference sent with or embedded in the serial data; and
            configured to be galvanically isolated from the second serial communications interface.

2. The serial communications interface of claim 1, wherein the serial communications interface is bidirectional.

3. The serial communications interface of claim 1, wherein the transmitter comprises a differential current driver including:
    a first current source;
    a second current source;
    a first switch configured to pull up the first node by providing a path from the first current source to the first node;
    a second switch configured to pull up the second node by providing a path from the first current source to the second node;
    a third switch configured to pull down the first node by providing a path from the second current source to the first node; and
    a fourth switch configured to pull up the second node by providing a path from the second current source to the second node.

4. The serial communications interface of claim 3, wherein the transmitter is configured to drive the twisted pair cable through a galvanic isolator.

5. The serial communications interface of claim 3, wherein the transmitter is configured to provide a 0 level at the differential output when both the first and second current sources are turned OFF.

6. The serial communications interface of claim 1, wherein the serial communications interface is configured to communicate as a master serial communications interface when a master node is tied to a first voltage level and as a slave serial communications interface when tied to a second voltage level.

7. The serial communications interface of claim 6, wherein the serial communications interface is configured to:
    be controlled by a master device when configured to communicate as the master serial communications interface; and
    control a slave device when configured to communicate as the slave serial communications interface.

8. The serial communications interface of claim 1, wherein the serial communications interface is galvanically isolated from the second serial communications interface through at least one of magnetic coupling and capacitive coupling.

9. The serial communications interface of claim 1, further comprising:
    a clock phase input node (PHA); and
    a clock polarity input node (POL), wherein the serial communications interface is configured to:
        in a first mode: provide positive pulses to a master microcontroller and latch the serial data on a rising clock edge;
        in a second mode: provide positive pulses to the master microcontroller and latch the serial data on a falling clock edge;
        in a third mode: provide negative pulses to the master microcontroller and latch the serial data on a rising clock edge; and
        in a fourth mode: provide negative pulses to the master microcontroller and latch the serial data on a falling clock edge.

10. The serial communications interface of claim 9, wherein the serial communications interface is:
    in a first mode when the POL node is at a first digital voltage level and the PHA node is at the first digital voltage level;
    in a second mode when the POL node is at the first digital voltage level and the PHA node is at a second digital voltage level;
    in a third mode when the POL node is at the first digital voltage level and the PHA node is at the first digital voltage level; and
    in a fourth mode when the POL node is at the first digital voltage level and the PHA node is at the second digital voltage level.

11. A serial communication method, comprising:
    receiving serial interface signals on a first set of input nodes;
    driving a twisted pair cable differentially at output nodes, the output nodes comprising a first node and a second node;
    transmitting serial data to and receiving serial data from a remote serial communications interface one data bit at a time, without a clock reference sent with or embedded in the serial data;
    galvanically isolating the transmitted signals from the remote serial communications interface;
    operating the transmitter and the twisted pair cable on opposite sides of the galvanic isolation; and
    operating the transmitter and the receiver on the same side of the galvanic isolation.

12. The serial communication method of claim 11, further comprising transferring the data over the twisted pair cable bidirectionally.

13. The serial communication method of claim 11, wherein the transmitting serial data includes:

pulling up the first node by providing a path from a first current source to the first node;

pulling up the second node by providing a path from the first current source to the second node;

pulling down the first node by providing a path from a second current source to the first node; and pulling up the second node by providing a path from the second current source to the second node.

14. The serial communication method of claim 13, wherein driving the twisted pair cable at the differential output is through a galvanic isolator.

15. The serial communication method of claim 13, further comprising providing a 0 level at the output nodes when both the first and second current sources are turned OFF.

16. The serial communication method of claim 11, further comprising communicating as a master serial communications interface when a master node is tied to a first voltage level and as a slave serial communications interface when tied to a second voltage level.

17. The serial communication method of claim 16, further comprising:

receiving control instructions from a master device when configured to communicate as the master serial communications interface; and controlling a slave device when configured to communicate as the slave serial communications interface.

18. The serial communication method of claim 11, wherein galvanically isolating from the remote serial communications interface is through at least one of magnetic coupling and capacitive coupling.

19. The serial communication method of claim 11, further comprising:

in a first mode: providing positive pulses to a master microcontroller and latching the serial data on a rising clock edge;

in a second mode: providing positive pulses to a master microcontroller and latching the serial data on a falling clock edge;

in a third mode: providing negative pulses to the master microcontroller and latching the serial data on a rising clock edge; and in a fourth mode: providing negative pulses to the master microcontroller and latching the serial data on the falling clock edge.

20. The serial communication method of claim 19, further comprising:

operating in a first mode when a clock polarity input (POL) node is at a first digital voltage level and a clock phase input node (PHA) node is at the first digital voltage level;

operating in a second mode when the POL node is at the first digital voltage level and the PHA node is at a second digital voltage level;

operating in a third mode when the POL node is at the first digital voltage level and the PHA node is at the first digital voltage level; and operating in a fourth mode when the POL node is at the first digital voltage level and the PHA node is at the second digital voltage level.

* * * * *